March 26, 1957  J. H. REID  2,786,993
RADAR CONTOUR CIRCUIT
Filed March 10, 1953

INVENTOR.
JAMES H. REID
BY
Darby & Darby
ATTORNEYS

United States Patent Office 2,786,993
Patented Mar. 26, 1957

2,786,993

RADAR CONTOUR CIRCUIT

James H. Reid, Maywood, N. J., assignor to Allen B. Du Mont Laboratories, Inc., Clifton, N. J., a corporation of Delaware Application March 10, 1953, Serial No. 341,555

3 Claims. (Cl. 343—5)

This invention relates to improvements in radar systems to distinguish, in a radar presentation, not only between "zero" echo and finite echoes, but also between finite echoes of low and high levels. In particular the invention relates to so-called iso-echo contour radar sets which are used for obtaining weather information and which are particularly advantageous in aircraft operation. Such radar sets incorporate means for displaying precise information of conditions existing in the path of flight so that the aircraft may be directed around areas of high turbulence.

In a radar presentation of a storm cloud, the echoes are a function of the moisture content and droplet size. Small droplets or a few large droplets give little or no return; many large droplets give a strong return. Regions of turbulence usually occur at the boundaries between areas of high rainfall and low rainfall. It is desirable that the airplane avoid the more turbulent of these regions.

Ordinary radar weather systems are capable of distinguishing clearly only between rain and no rain, and a P. P. I. presentation derived from such systems shows only white areas for rain and black areas for no rain. In an effort to distinguish between areas of moderate rainfall and areas of high rainfall, the boundaries of which coincide with regions of highest turbulence, prior art iso-echo contour circuits have been provided with clipping means to clip the highest peaks of the return video signal and means to generate a blanking pulse from the clipped peak signals to turn off the beam in the cathode ray P. P. I. display tube of the radar system for the duration of the peak signals. Thus a white area on the cathode ray tube screen indicating an area of some rainfall would have a black patch indicating an area of high rainfall.

However, such a black center would be indistinguishable from a black patch which indicated no rain at all inside a white area which indicated some rainfall.

It is an object of this invention to provide means, in radar systems, to distinguish between weak, medium, and strong echoes.

It is a further object to provide means, in iso-echo contour circuits, whereby high rainfall areas surrounded by moderate rainfall areas may be distinguished from low rainfall areas surrounded by moderate rainfall areas.

Figure 1:
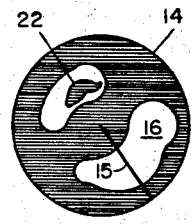

Other objects will become apparent from a study of the following specification together with the drawings in which:

Fig. 1 shows a radar presentation with two extensive targets, one of which has a "hole" (zero echo area) in it.

Figure 2:
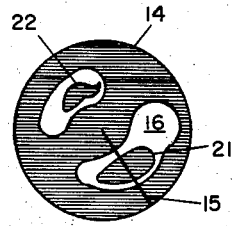

Fig. 2 shows the same presentation as it might appear with ordinary iso-echo contour circuits in operation. The peaks of the echoes have been clipped and inverted so as to make a black patch in those areas where the video exceeds the pre-set clipping level. Note that there is no way of distinguishing between zero echo and high amplitude echo. The black patch (strong return) in the larger target is indistinguishable from the hole (zero return) in the smaller target.

Figure 3:
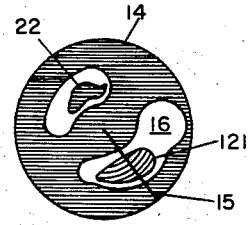
Figure 4:
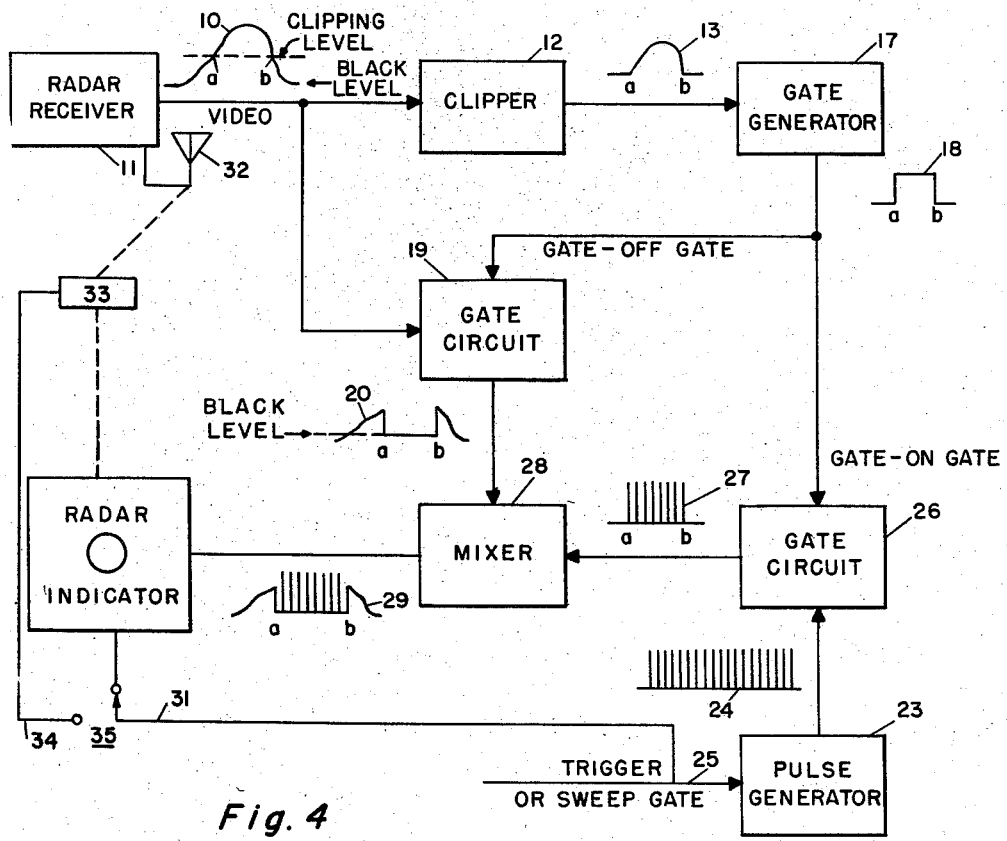

Fig. 3 shows the type of presentation obtained with one embodiment of this invention, and Fig. 4 is a block diagram of the circuit of this invention.

Referring now to Fig. 4, the radar video signal 10 is fed from the radar receiver 11 into a clipper 12 which clips off all the signal below a pre-set level so that the signal appears as at 13. Signal 10 represents the radar echo when the beam of a P. P. I. display tube 14 is traversing a path 15 which cuts across an area 16 indicating rainfall. While area 16 is shown as having a sharp line of demarcation at the boundary thereof, this boundary may comprise a graduated gray scale, tapering from black to white. The clipped signal 13 is fed into a gate generator 17 which generates a gating pulse 18 corresponding in length to the duration of the signal 13.

The radar video signal 10 is also fed through a gate circuit 19 which is controlled by the gating pulse 18, as shown at 20. Signal 20 represents a simple iso-echo contour signal as displayed in Fig. 2, and it is impossible to distinguish between the black patch 21 generated by gating pulse 18 and the black patch 22 indicating no rainfall.

In order to identify more accurately the patch 21, a pulse generator 23 is provided which generates a series of narrow pulses 24 when actuated by a trigger or sweep gate signal applied at 25. These pulses 24 are fed through a gate circuit 26 which is controlled by the gating pulse 18. In this case the gating pulse is used to open rather than to close the gate circuit and the pulses are passed through only in the presence of the gate. There is thus produced a short burst of pulses 27 which are fed into a mixer circuit 28 where they are combined with the previously gated video signal 20, resulting in an output signal as shown at 29, which is applied to the indicator 30 in the normal manner.

If the trigger or sweep gate applied at 25 is synchronized with the start of each radial radar sweep, the pulses 24 will be seen on the screen as concentric arcs as shown in Fig. 3. If a different pulse repetition rate is used and a trigger synchronized with the rotation of the antenna is used, then spiral or even radial lines, or "rays," will appear in strong-return areas such as patch 121. In either case the high-rainfall area will be positively identified and pilots will have adequate warning.

To complete the explanation of the mode of operation of my invention, the trigger or sweep gate applied through line 25 to pulse generator 23 is simultaneously applied through line 31 to indicator 30 to synchronize the trigger or sweep gate with the start of each radial sweep of the indicator. It is also necessary to synchronize the rotation of antenna 32 with the P. P. I. presentation on indicator 30. This is done through the synchronizing means indicated as 33 and the dotted lines connecting antenna 32 with indicator 30. In the alternative, the trigger or sweep gate applied through line 25 to pulse generator 23 may be applied through line 24 and switch 35 to synchronizing means 33 to synchronize the trigger or sweep gate with the start of each radial sweep of antenna 32.

While I have illustrated and described different embodiments of my invention it will be apparent that many modifications may be made and I wish therefore not to be limited by the foregoing description, but on the contrary only by claims granted to me.

What is claimed is:

1. In an iso-echo contour circuit including a radar receiver, an antenna to receive echoes, and a radar indicator, means for distinguishing between several types of echoes, said means comprising a source of radar video signals, a clipping circuit connected thereto, a gate generating circuit connected to said clipping circuit, a first and a second gate circuit each connected to said gate generating circuit, said first gate circuit being an off gate and said second gate circuit being an on gate, a pulse generator generating a continuous series of narrow pulses, the output of which is connected to said second gate circuit, said source of video signals being connected also to said first gate circuit, a mixer circuit, the output of said first and said second gate circuits being connected to said mixer circuit, the output of said mixer circuit being connected to said radar indicator, whereby pulses from said pulse generator are caused to influence the presentation on said radar indicator.

2. The circuit of claim 1, in which said pulses are synchronized with the start of each radial sweep of said radar indicator.

3. The circuit of claim 1, in which said pulses are synchronized with the start of each radial sweep of the antenna of said radar receiver.

References Cited in the file of this patent

UNITED STATES PATENTS

| | | |
|---|---|---|
| 2,428,351 | Ayres | Oct. 7, 1947 |
| 2,522,551 | Williams | Sept. 19, 1950 |
| 2,532,546 | Forbes | Dec. 5, 1950 |
| 2,656,531 | Atlas | Oct. 20, 1953 |